US012288898B2

(12) United States Patent
Sato

(10) Patent No.: US 12,288,898 B2
(45) Date of Patent: Apr. 29, 2025

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventor: Megumi Sato, Osaka (JP)

(73) Assignee: TEIJIN LIMITED, Osaka (JP)

( * ) Notice: Subject to any disclaimer, the term of this patent is extended or adjusted under 35 U.S.C. 154(b) by 781 days.

(21) Appl. No.: 17/439,447

(22) PCT Filed: Feb. 13, 2020

(86) PCT No.: PCT/JP2020/005656

§ 371 (c)(1),
(2) Date: Sep. 15, 2021

(87) PCT Pub. No.: WO2020/189112

PCT Pub. Date: Sep. 24, 2020

(65) Prior Publication Data

US 2022/0158301 A1 May 19, 2022

(30) Foreign Application Priority Data

Mar. 18, 2019 (JP) ................................ 2019-049545

(51) Int. Cl.

| | |
|---|---|
| ***H01M 50/446*** | (2021.01) |
| ***H01M 4/62*** | (2006.01) |
| ***H01M 50/409*** | (2021.01) |
| ***H01M 50/426*** | (2021.01) |
| ***H01M 50/489*** | (2021.01) |
| ***H01M 50/491*** | (2021.01) |

(52) U.S. Cl.

CPC ......... *H01M 50/446* (2021.01); *H01M 4/623* (2013.01); *H01M 4/626* (2013.01); *H01M 50/409* (2021.01); *H01M 50/426* (2021.01); *H01M 50/491* (2021.01); *H01M 50/489* (2021.01)

(58) Field of Classification Search

None

See application file for complete search history.

(56) References Cited

U.S. PATENT DOCUMENTS

| | | | |
|---|---|---|---|
| 2012/0202102 | A1 | 8/2012 | Kakibe et al. |
| 2014/0248525 | A1 | 9/2014 | Iwai et al. |
| 2014/0255754 | A1 | 9/2014 | Nishikawa et al. |
| 2014/0315068 | A1 | 10/2014 | Nishikawa et al. |
| 2015/0030906 | A1 | 1/2015 | Amin-Sanayei et al. |
| 2017/0098809 | A1 | 4/2017 | Ogata et al. |
| 2017/0179456 | A1 | 6/2017 | Kim et al. |
| 2017/0229698 | A1 | 8/2017 | Mizuno |
| 2018/0212220 | A1 | 7/2018 | Kuratani et al. |
| 2019/0273238 | A1 | 9/2019 | Mizuno et al. |
| 2020/0266407 | A1 | 8/2020 | Honda et al. |

FOREIGN PATENT DOCUMENTS

| | | | | | |
|---|---|---|---|---|---|
| CN | 103891001 | A | | 6/2014 | |
| CN | 106784532 | A | | 5/2017 | |
| CN | 107492625 | A | | 12/2017 | |
| EP | 3 070 764 | A1 | | 9/2016 | |
| EP | 3627586 | A1 | | 3/2020 | |
| JP | 2001-319690 | A | | 11/2001 | |
| JP | 2004-253380 | A | | 9/2004 | |
| JP | 2005-019156 | A | | 1/2005 | |
| JP | 2005-019157 | A | | 1/2005 | |
| JP | 2005-056800 | A | | 3/2005 | |
| JP | 4127989 | B2 | | 7/2008 | |
| JP | 2012-109123 | A | | 6/2012 | |
| JP | 2013-69582 | A | | 4/2013 | |
| JP | 2013-187074 | A | | 9/2013 | |
| JP | 5757363 | B1 | | 7/2015 | |
| JP | 2015-181110 | A | | 10/2015 | |
| JP | 2016-33913 | A | | 3/2016 | |
| JP | 2017-66350 | A | | 4/2017 | |
| JP | 2017-117784 | A | | 6/2017 | |
| JP | 2017-162699 | A | | 9/2017 | |
| JP | 2017-183212 | A | | 10/2017 | |
| JP | 2017183212 | A2 | † | 10/2017 | |
| JP | 2018-181546 | A | | 11/2018 | |
| KR | 10-2012-0070976 | A | | 7/2012 | |
| KR | 20120070976 | A | † | 7/2012 | |
| KR | 10-2017-0074535 | A | | 6/2017 | |
| KR | 20170074535 | A | † | 6/2017 | |
| WO | WO-2013058368 | A1 | * | 4/2013 | .............. C09D 1/00 |
| WO | 2014/007260 | A1 | | 1/2014 | |
| WO | 2015/156127 | A1 | | 10/2015 | |
| WO | 2018/168835 | A1 | | 9/2018 | |

OTHER PUBLICATIONS

Machine translation of JP 2017-183212, published on Oct. 5, 2017 (Year: 2017).*

Machine translation of JP 2016-033913, published on Mar. 10, 2016 (Year: 2016).*

Machine translation of WO2013/058368 (Year: 2013).*

International Search Report of PCT/JP2020/005656 dated Apr. 14, 2020 [PCT/ISA/210].

* cited by examiner
† cited by third party

*Primary Examiner* — Anca Eoff

(74) *Attorney, Agent, or Firm* — Sughrue Mion, PLLC

(57) ABSTRACT

Provided is a separator for a non-aqueous secondary battery containing a porous substrate; and a heat-resistant porous layer that is provided on one side or on both sides of the porous substrate, and that contains a polyvinylidene fluoride type resin A that is a polyvinylidene fluoride type resin containing a tetrafluoroethylene unit; a polyvinylidene fluoride type resin B that is a polyvinylidene fluoride type resin other than the polyvinylidene fluoride type resin A; and a filler, in which an average primary particle diameter of the filler contained in the heat-resistant porous layer is from 0.01 μm to 1.0 μm.

18 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2020/005656, filed Feb. 13, 2020, claiming priority to Japanese Patent Application No. 2019-049545, filed Mar. 18, 2019.

TECHNICAL FIELD

The present invention relates to a separator for a non-aqueous secondary battery and a non-aqueous secondary battery.

BACKGROUND ART

The separator, which is one of the members constituting the non-aqueous secondary battery, is required to have heat resistance that does not easily break the film or shrink even when the inside of the battery gets hot in order to ensure the safety of the battery. As a separator having increased heat resistance, a separator including a porous layer containing a filler on a porous substrate is known. For example, Patent Document 1 discloses a separator including a porous layer containing at least one kind of inorganic particle of metal oxide particles and metal hydroxide particles on a porous substrate.

In addition, the separator is required to have adhesiveness that does not easily peel off from the electrode even when the separator receives an impact from the outside or the electrode expands and contracts due to charging and discharging. As a separator having increased adhesiveness to an electrode, a separator is known in which a resin layer containing a resin exhibiting adhesiveness to an electrode is provided on a porous substrate. For example, Patent Document 2 discloses a separator including a porous layer containing a polyvinylidene fluoride type resin on a porous substrate.

PRIOR ART DOCUMENTS

Patent Documents

Patent Document 1: Japanese Patent No. 5757363
Patent Document 2: Japanese Patent No. 4127989

SUMMARY OF INVENTION

Technical Problem

In manufacturing a battery, a laminated body in which a separator is disposed between a positive electrode and a negative electrode may be subjected to dry heat pressing (hot pressing treatment performed without impregnating the separator with an electrolytic solution). When the separator and the electrode are favorably bonded by the dry heat press, the separator and the electrode are less likely to be misaligned in the manufacturing process of the battery, and the production yield of the battery can be improved. There is a demand for a separator that has heat resistance and is favorably bonded to an electrode by the dry heat press.

An embodiment of the present disclosure was achieved under the above described circumstances.

An object of an embodiment of the present disclosure is to provide a separator for a non-aqueous secondary battery which has heat resistance and is excellent in adhesion to an electrode by dry heat press, and an object thereof is to solve this problem.

Solution to Problem

The specific solutions to the problem include the following embodiments.

[1] A separator for a non-aqueous secondary battery, the separator containing:

a porous substrate; and a heat-resistant porous layer that is provided on one side or on both sides of the porous substrate, and that contains a polyvinylidene fluoride type resin A that is a polyvinylidene fluoride type resin containing a tetrafluoroethylene unit; a polyvinylidene fluoride type resin B that is a polyvinylidene fluoride type resin other than the polyvinylidene fluoride type resin A; and a filler, wherein an average primary particle diameter of the filler contained in the heat-resistant porous layer is from 0.01 μm to 1.0 μm.

[2] The separator for a non-aqueous secondary battery according to [1], wherein the average primary particle diameter of the filler contained in the heat-resistant porous layer is from 0.01 μm to 0.5 μm.

[3] The separator for a non-aqueous secondary battery according to [1] or [2], wherein the filler contains at least one selected from the group consisting of metal sulfate particles, metal hydroxide particles, metal oxide particles, and metal nitride particles.

[4] The separator for a non-aqueous secondary battery according to any one of [1] to [3], wherein a volume ratio of the filler in the heat-resistant porous layer is from 30% by volume to 90% by volume.

[5] The separator for a non-aqueous secondary battery according to any one of [1] to [4], wherein a melting point of the polyvinylidene fluoride type resin A is from 120° C. to 150° C.

[6] The separator for a non-aqueous secondary battery according to any one of [1] to [5], wherein a weight average molecular weight of the polyvinylidene fluoride type resin A is from 600,000 to 3,000,000.

[7] The separator for a non-aqueous secondary battery according to any one of [1] to [6], wherein a melting point of the polyvinylidene fluoride type resin B is from 120° C. to 173° C.

[8] The separator for a non-aqueous secondary battery according to any one of [1] to [7], wherein a weight average molecular weight of the polyvinylidene fluoride type resin B is from 300,000 to 3,000,000.

[9] The separator for a non-aqueous secondary battery according to any one of [1] to [8], wherein the polyvinylidene fluoride type resin B is a polyvinylidene fluoride type resin containing a hexafluoropropylene unit.

[10] The separator for a non-aqueous secondary battery according to any one of [1] to [9], wherein a porosity of the heat-resistant porous layer is from 30% to 90%.

[11] A non-aqueous secondary battery that obtains electromotive force by lithium doping and dedoping, the non-aqueous secondary battery containing:

a positive electrode;

a negative electrode; and the separator for a non-aqueous secondary battery according to any one of [1] to [10], the separator being disposed between the positive electrode and the negative electrode.

Advantageous Effects of Invention

According to the present disclosure, there is provided a separator for a non-aqueous secondary battery having heat resistance and excellent adhesion to an electrode by dry heat press.

DESCRIPTION OF EMBODIMENTS

Hereinafter, the embodiments will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values.

In the present disclosure, the term "process" includes not only an independent process, but also the process which is not clearly distinguished from other processes but achieves the desired purpose thereof.

In the present disclosure, when the amount of each component in a composition is referred to and when a plurality of substances corresponding to each component are present in the composition, the total amount of the plurality of components present in the composition is meant unless otherwise specified.

A plurality of kinds of particles corresponding to each component in the present disclosure may be contained. When there are a plurality of kinds of particles corresponding to each component in a composition, a particle diameter of each component means a value for a mixture of the plurality of kinds of particles present in the composition unless otherwise specified.

In the present disclosure, "MD direction" refers to the longitudinal direction of a porous substrate and a separator manufactured in a long shape, and "TD direction" refers to a direction orthogonal to "MD direction". "MD direction" also refers to "a machine direction", and "TD direction" also refers to "a transverse direction".

In the present disclosure, in a case where a lamination relationship among layers constituting a separator is expressed as "upper" and "lower", a layer closer to a substrate is referred to as "lower", and a layer farther from the substrate is referred to as "upper".

In the present disclosure, the notation "(meth)acryl" means either "acryl" or "methacryl".

In the present disclosure, "monomer unit" of a copolymer or a resin means a constituent unit of the copolymer or the resin, and means a constituent unit obtained by polymerizing a monomer.

In the present disclosure, a heat-resistant resin refers to a resin having a melting point of 200° C. or higher, or a resin having no melting point and having a decomposition temperature of 200° C. or higher. That is, the heat-resistant resin in the present disclosure is a resin that is not melted or decomposed in a temperature range of lower than 200° C.

In the present disclosure, performing the hot pressing treatment by impregnating the separator with the electrolytic solution is referred to as "wet heat press", and performing the hot pressing treatment without impregnating the separator with the electrolytic solution is referred to as "dry heat press".

In the present disclosure, vinylidene fluoride is also referred to as "VDF", tetrafluoroethylene is also referred to as "TFE", and hexafluoropropylene is also referred to as "HFP".

<Separator for Non-Aqueous Secondary Battery>

A separator for a non-aqueous secondary battery (also simply referred to as "separator") of the present disclosure includes a porous substrate and a heat-resistant porous layer provided on one side or on both sides of the porous substrate.

In the separator of the present disclosure, the heat-resistant porous layer contains, as binder resins, at least a polyvinylidene fluoride type resin A that is a polyvinylidene fluoride type resin containing a tetrafluoroethylene unit and a polyvinylidene fluoride type resin B that is a polyvinylidene fluoride type resin other than the polyvinylidene fluoride type resin A. In the present disclosure, the polyvinylidene fluoride type resin A is also referred to as "PVDF type resin A", and the polyvinylidene fluoride type resin B is also referred to as "PVDF type resin B".

The PVDF type resin B is a polyvinylidene fluoride type resin other than the PVDF type resin A, that is, a polyvinylidene fluoride type resin containing no tetrafluoroethylene unit.

In the separator of the present disclosure, the heat-resistant porous layer contains a filler, and the filler contained in the heat-resistant porous layer has an average primary particle diameter of from 0.01 μm to 1.0 μm.

In the separator of the present disclosure, the heat resistance of the porous layer and the separator is increased by including a filler in the porous layer provided on one side or both sides of the porous substrate. The polyvinylidene fluoride type resin is a resin suitable as a binder resin of the porous layer from the viewpoints of stability to an electrolytic solution, electrochemical stability, adhesiveness to an electrode, heat resistance, and the like. By using the polyvinylidene fluoride type resin as the binder resin of the porous layer, a separator suitable for a non-aqueous secondary battery can be obtained.

From the above viewpoint, the heat-resistant porous layer of the separator of the present disclosure contains a polyvinylidene fluoride type resin and a filler, the heat-resistant porous layer of the separator of the present disclosure further contains two kinds of polyvinylidene fluoride type resins, PVDF type resin A and PVDF type resin B, and the filler contained in the heat-resistant porous layer has an average primary particle diameter of from 0.01 μm to 1.0 μm. The separator having such a configuration has excellent adhesion to the electrode by the dry heat pressing while having heat resistance. As a mechanism thereof, the following is presumed.

It is presumed that since an average primary particle diameter of the filler is 1.0 μm or less, that is, a particle diameter of the filler is relatively small, a surface area (specific surface area) of the filler per unit volume increases, and therefore a contact point between the filler and the binder resin increases, so the shrinkage of the heat-resistant porous layer when exposed to a high temperature is suppressed. In addition, it is presumed that shrinkage of the heat-resistant porous layer when exposed to a high temperature is suppressed by being densely filled with a filler having a small particle diameter.

It is presumed that since the average primary particle diameter of the filler is 1.0 μm or less, there are few protrusions protruding from the surface of the heat-resistant porous layer, and the heat-resistant porous layer is excellent in adhesion to the electrode and the porous substrate.

When the average primary particle diameter of the filler is 0.01 μm or more, aggregation of the fillers is suppressed, and uniformity of the surface property of the heat-resistant porous layer is high. It is presumed that the heat-resistant porous layer having high uniformity of surface properties is excellent in adhesion to the electrode and the porous substrate.

Although the detailed mechanism is not clear, the heat-resistant porous layer containing the PVDF type resin A and the PVDF type resin B is more excellent in adhesion to the electrode by the dry heat pressing than the heat-resistant porous layer containing a single kind of polyvinylidene fluoride type resin. The heat-resistant porous layer containing the PVDF type resin A and the PVDF type resin B is excellent in adhesion to an electrode by the dry heat pressing not only for an electrode formed using a slurry in which a binder resin (for example, polyvinylidene fluoride type resin) is dissolved in a solvent but also for an electrode formed using a slurry in which a particulate binder (for example, styrene-butadiene copolymer particles and polyvinylidene fluoride type resin particles) is dispersed in water.

It is presumed that the separator of the present disclosure is excellent in adhesion to the electrode by the dry heat pressing while having heat resistance due to the synergistic action described above.

Hereinafter, the porous substrate and the heat-resistant porous layer contained in the separator of the present disclosure will be described in detail.

[Porous Substrate]

The porous substrate in the present disclosure refers to a substrate having pores or voids therein. As the substrate, a microporous film; a porous sheet such as non-woven fabric and paper, composed of a fibrous material; a composite porous sheet in which on a microporous film or a porous sheet, one or more of another porous layer are laminated; and the like may be listed. In the present disclosure, a microporous film is preferable from the viewpoint of thinning and strength of a separator. The microporous film refers to a film having a large number of micropores therein, having a structure in which these micropores are connected to each other, and allowing gas or liquid to pass from one side to the other side.

As the material for the porous substrate, materials having electrical insulation are preferably used and any of organic materials and inorganic materials may be used.

It is preferred that the porous substrate contains a thermoplastic resin, from the viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from the viewpoint of exhibiting the shutdown function, and the content of polyethylene is preferably 95% by mass or more with respect to the total mass of the polyolefin microporous film.

It is preferred that the microporous film contains polypropylene, from the viewpoint of imparting heat resistance to the extent that the film is not easily broken when exposed to a high temperature.

It is preferred that the polyolefin microporous film contains polyethylene and polypropylene, from the viewpoint of imparting shutdown function and heat resistance that the film is not easily broken when exposed to a high temperature. As the polyolefin microporous film including polyethylene and polypropylene, a microporous film in which polyethylene and polypropylene are present in a mixed state in a layer may be mentioned. It is preferred that the microporous film contains 95% by mass or more of polyethylene and 5% by mass or less of polypropylene, from the viewpoint of compatibility of the shutdown function and heat resistance. In addition, from the viewpoint of compatibility of the shutdown function and heat resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight average molecular weight (Mw) of from 100,000 to 5,000,000 is preferred. When the polyolefin has a Mw of 100,000 or more, sufficient mechanical properties may be provided to the microporous film. Meanwhile, when the polyolefin has a Mw of 5,000,000 or less, the shutdown characteristic of the microporous film is favorable, and film molding of the microporous film is easy.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; heat-resistant resins such as wholly aromatic polyamide, polyamide-imide, polyimide, polyethersulfone, polysulfone, polyetherketone and polyetherimide; cellulose; and the like, or paper may be mentioned.

Examples of the composite porous sheet include a sheet in which a functional layer is stacked on a porous sheet made of a microporous film or a fibrous material. Such a composite porous sheet is preferable from the viewpoint that a function can be further added thereto with a functional layer. Examples of the functional layer include a porous layer made of a heat-resistant resin and a porous layer made of a heat-resistant resin and an inorganic filler from the viewpoint of imparting heat resistance. Examples of the heat-resistant resin include one or more heat-resistant resins selected from the group consisting of a wholly aromatic polyamide, a polyamide imide, a polyimide, a polyethersulfone, a polysulfone, a polyetherketone, and a polyetherimide. Examples of the inorganic filler include a metal oxide such as alumina, and a metal hydroxide such as magnesium hydroxide. Examples of a method of forming a composite include a method of applying a functional layer to a microporous film or a porous sheet, a method of bonding a microporous film or a porous sheet and a functional layer with an adhesive, and a method of thermally press-bonding a microporous film or a porous sheet with a functional layer.

The surface of the porous substrate may be subjected to various surface treatments within the range of not impairing the nature of the porous substrate, for the purpose of improving wettability with the coating liquid for forming the heat-resistant porous layer. As the surface treatment, corona treatment, plasma treatment, flame treatment, UV irradiation treatment, and the like may be mentioned.

[Characteristics of Porous Substrate]

The thickness of the porous substrate is preferably 25 μm or less, more preferably 20 μm or less, and still more preferably 15 μm or less, from the viewpoint of enhancing energy density of the battery, and is preferably 3 μm or more, more preferably 5 μm or more, from the viewpoint of production yield of the separator and production yield of the battery.

The Gurley value of the porous substrate (JIS P8117: 2009) is preferably from 50 sec/100 ml to 800 sec/100 ml, and more preferably from 50 sec/100 ml to 400 sec/100 ml, from the viewpoint of obtaining favorable ion permeability or suppression of battery short circuit.

The porosity of the porous substrate is preferably 20% to 60% from the viewpoint of obtaining appropriate membrane resistance and shutdown function. The porosity ε (%) of the porous substrate is determined by the following formula.

$$\varepsilon=\{1-(Wa/da+Wb/db+Wc/dc+\ldots+Wn/dn)/t\}\times 100$$

Here, the constituent materials of the porous substrate are a, b, c, . . . , and n, the masses of the constituent materials are Wa, Wb, Wc, . . . , and Wn ($g/cm^2$), the true densities of the constituent materials are da, db, dc, . . . , and do ($g/cm^3$), and the thickness of the porous substrate is t (cm).

A puncture strength of the porous substrate is preferably 160 gf (1.6N) or more, and more preferably 200 gf (2.0N) or more, from the viewpoint of the production yield of the separator and the production yield of the battery. The puncture strength of the porous substrate refers to a maximum puncture strength (gf) measured by performing a puncture test under the conditions of a needle tip radius of curvature of 0.5 mm and a puncture speed of 2 mm/sec using a KES-G5 handy compression tester manufactured by Kato Tech Co., Ltd.

An average pore size of the porous substrate is preferably from 15 nm to 100 nm. When the average pore size of the porous substrate is 15 nm or more, ions are likely to move, and favorable battery performance is likely to be obtained. From this viewpoint, the average pore size of the porous substrate is more preferably 25 nm or more, and still more preferably 30 nm or more. When the average pore size of the porous substrate is 100 nm or less, the peel strength between the porous substrate and the heat-resistant porous layer can be improved, and a favorable shutdown function can also be exhibited. From this viewpoint, the average pore size of the porous substrate is more preferably 90 nm or less, and still more preferably 80 nm or less. The average pore size of the porous substrate is a value measured using a palm porometer, and is measured using a palm porometer (CFP-1500-A manufactured by PMI) in accordance with ASTM E1294-89.

[Heat-Resistant Porous Layer]

In the separator of the present disclosure, the heat-resistant porous layer is provided as an outermost layer of the separator on one side or both sides of the porous substrate, and is a layer that adheres to the electrode when the separator and the electrode are stacked and pressed or hot-pressed. The heat-resistant porous layer has a large number of micropores therein and has a structure in which the micropores are connected, and is a layer through which a gas or a liquid can pass from one side to the other side.

In the separator of the present disclosure, the heat-resistant porous layer may be provided only on one side of the porous substrate, or may be provided on both sides of the porous substrate. When the heat-resistant porous layers are provided on both sides of the porous substrate, the heat resistance of the separator is further improved. In addition, the separator is less likely to be curled, and has excellent handleability during production of a battery. When the heat-resistant porous layer is provided only on one side of the porous substrate, the ion permeability of the separator is further improved. In addition, the thickness of the entire separator can be suppressed, and a battery having a higher energy density can be produced.

In the separator of the present disclosure, the heat-resistant porous layer contains at least a PVDF type resin A, a PVDF type resin B, and a filler. In the separator of the present disclosure, the heat-resistant porous layer may contain a resin other than the polyvinylidene fluoride type resin, an organic filler, or the like.

Hereinafter, components contained in the heat-resistant porous layer of the separator of the present disclosure will be described in detail.

—PVDF Type Resin A—

The PVDF type resin A includes both a copolymer obtained by polymerizing only vinylidene fluoride (VDF) and tetrafluoroethylene (TFE), and a copolymer obtained by polymerizing VDF and TFE and other monomers.

Examples of monomers other than VDF and TFE that can constitute the PVDF type resin A include halogen-containing monomers such as trifluoroethylene, chlorotrifluoroethylene, vinyl fluoride, trichlorethylene, and hexafluoropropylene; monomers with carboxy groups (for example, (meth)acrylic acid, (meth)acrylate, maleic acid, maleic anhydride, maleic acid ester, and fluorine substituents thereof), and the like. The PVDF type resin A may contain monomer units derived from one or two or more of these monomers.

The PVDF type resin A preferably has a melting point of from 120° C. to 150° C. When the melting point of the PVDF type resin A is 150° C. or lower, the flexibility of the PVDF type resin A is likely to increase during the dry heat press, which is advantageous for adhesiveness between the heat-resistant porous layer and the electrode. When the melting point of the PVDF type resin A is 120° C. or higher, the heat resistance of the separator is likely to be secured.

The melting point of the polyvinylidene fluoride type resin is determined from a differential scanning calorimetry curve (DSC curve) obtained by performing differential scanning calorimetry (DSC). Specifically, the polyvinylidene fluoride type resin is placed in a sample chamber of the differential scanning calorimeter, and heated in a range of from 30° C. to 200° C. at a rate of 5° C./min under a nitrogen atmosphere to obtain the DSC curve. A temperature of an endothermic peak appearing in the DSC curve is defined as the melting point of the polyvinylidene fluoride type resin. When there are a plurality of endothermic peaks, the temperature of the lowest endothermic peak is defined as the melting point. The polyvinylidene fluoride type resin as a sample is obtained by peeling off the porous layer from the porous substrate and removing the filler from the peeled porous layer.

The PVDF type resin A preferably has a weight average molecular weight (Mw) of from 600,000 to 3,000,000. When the Mw of the PVDF type resin A is 3,000,000 or less, the viscosity of the coating liquid for molding the heat-resistant porous layer does not become too high, and it is easy to mold the heat-resistant porous layer having a porous structure with high uniformity. In addition, when the dry heat pressing is performed under mild conditions, the flexibility of the PVDF type resin A tends to increase, which is advantageous for the adhesiveness between the heat-resistant porous layer and the electrode. From these viewpoints, Mw of the PVDF type resin A is preferably 3,000,000 or less, more preferably 2,500,000 or less, and still more preferably 2,300,000 or less. When the Mw of the PVDF type resin A is 600,000 or more, the heat-resistant porous layer may be imparted with mechanical properties that may withstand adhesion treatment with an electrode. From this viewpoint, the Mw of the PVDF type resin A is preferably 600,000 or more, more preferably 650,000 or more, still more preferably 700,000 or more.

—PVDF Type Resin B—

Examples of the PVDF type resin B include a homopolymer (that is, polyvinylidene fluoride) of VDF; a copolymer (polyvinylidene fluoride copolymer) of VDF and monomers other than TFE; and mixtures thereof. Examples of the monomers other than TFE copolymerizable with VDF include hexafluoropropylene, trifluoroethylene, chlorotrifluoroethylene, vinyl fluoride, trichloroethylene, and the like, and one kind or two or more kinds thereof can be used.

The PVDF type resin B preferably has a melting point of from 120° C. to 173° C. When the melting point of the PVDF type resin B is 173° C. or lower, the flexibility of the PVDF type resin B is likely to increase during the dry heat press, which is advantageous for the adhesiveness between the heat-resistant porous layer and the electrode. When the melting point of the PVDF type resin B is 120° C. or higher, the heat resistance of the separator is likely to be secured.

The PVDF type resin B preferably has a weight average molecular weight (Mw) of from 300,000 to 3,000,000. When the Mw of the PVDF type resin B is 3,000,000 or less, the viscosity of the coating liquid for molding the heat-resistant porous layer does not become too high, and it is easy to mold the heat-resistant porous layer having a porous structure with high uniformity. In addition, when the dry heat pressing is performed under mild conditions, the flexibility of the PVDF type resin B tends to increase, which is advantageous for the adhesiveness between the heat-resistant porous layer and the electrode. From these viewpoints, Mw of the PVDF type resin B is preferably 3,000,000 or less, more preferably 2,000,000 or less, and still more preferably 1,800,000 or less. When the Mw of the PVDF type resin B is 300,000 or more, the heat-resistant porous layer may be imparted with mechanical properties that may withstand adhesion treatment with an electrode. From this viewpoint, the Mw of the PVDF type resin B is preferably 300,000 or more, more preferably 350,000 or more, still more preferably 400,000 or more. However, when the Mw of the PVDF type resin A is relatively high, the PVDF type resin A can impart mechanical properties that can withstand adhesion treatment with an electrode, so the Mw of the PVDF type resin B may be preferably less than 300,000.

The PVDF type resin B is preferably a copolymer of vinylidene fluoride (VDF) and hexafluoropropylene (HFP) (VDF-HFP copolymer) from the viewpoint of the adhesiveness to an electrode. The VDF-HFP copolymer that is the PVDF type resin B in the present disclosure includes both a copolymer obtained by polymerizing only VDF and HFP, and a copolymer obtained by polymerizing VDF and HFP and other monomers other than these VDF and HFP (however, monomers other than TFE). The VDF-HFP copolymer can control crystallinity, heat resistance, solubility resistance to an electrolytic solution, and the like of the copolymer within appropriate ranges by increasing or decreasing the content of the HFP unit.

Examples of the monomers other than VDF and HFP that can constitute the VDF-HFP copolymer and TFE include halogen-containing monomers such as trifluoroethylene, chlorotrifluoroethylene, vinyl fluoride, and trichloroethylene; monomer having carboxy group (for example, (meth) acrylic acid, (meth)acrylate, maleic acid, maleic anhydride, maleic acid ester, and fluorine-substituted products thereof); and the like. The VDF-HFP copolymer may contain monomer units derived from one kind or two or more kinds of these monomers.

The VDF-HFP copolymer as the PVDF type resin B may contain monomer units other than VDF, HFP, and TFE, but the content of the other monomer units is preferably smaller than the content of the HFP units. The content of other monomer units is preferably less than 8% by mol and more preferably 5% by mol or less with respect to the total monomer units.

The total content of the PVDF type resin A and the PVDF type resin B contained in the heat-resistant porous layer is preferably 85% by mass or more, more preferably 90% by mass or more, still more preferably 95% by mass or more, and still further more preferably 100% by mass with respect to the total amount of the binder resin contained in the heat-resistant porous layer.

The total content of the PVDF type resin A and the PVDF type resin B contained in the heat-resistant porous layer is preferably from 10% by volume to 90% by volume, more preferably from 20% by volume to 80% by volume, and still more preferably from 30% by volume to 70% by volume with respect to the total solid content contained in the heat-resistant porous layer.

The mass ratio of the PVDF type resin A and the PVDF type resin B contained in the heat-resistant porous layer (PVDF type resin A:PVDF type resin B) is preferably from 5:95 to 95:5, more preferably from 15:85 to 85:15, and still more preferably from 25:75 to 75:25.

The content of the PVDF type resin A contained in the heat-resistant porous layer is preferably 5% by mass to 95% by mass, more preferably 15% by mass to 85% by mass, and still more preferably 25% by mass to 75% by mass with respect to the total amount of the binder resin contained in the heat-resistant porous layer.

The content of the PVDF type resin A contained in the heat-resistant porous layer is preferably 1% by volume to 70% by volume, more preferably 5% by volume to 65% by volume, and still more preferably 10% by volume to 60% by volume with respect to the total solid content contained in the heat-resistant porous layer.

The content of the PVDF type resin B contained in the heat-resistant porous layer is preferably 5% by mass to 95% by mass, more preferably 15% by mass to 85% by mass, and still more preferably 25% by mass to 75% by mass with respect to the total amount of the binder resin contained in the heat-resistant porous layer.

The content of the PVDF type resin B contained in the heat-resistant porous layer is preferably 1% by volume to 70% by volume, more preferably 5% by volume to 65% by volume, and still more preferably 10% by volume to 60% by volume with respect to the total solid content contained in the heat-resistant porous layer.

Examples of the method of preparing a polyvinylidene fluoride type resin include an emulsion polymerization method and a suspension polymerization method. In addition, it is also possible to use a commercially available polyvinylidene fluoride type resin.

—Other Resins—

The heat-resistant porous layer may contain a resin other than the polyvinylidene fluoride type resin.

Examples of the other resins include fluororubber, a styrene-butadiene copolymer, an acrylic type resin, a styrene-acrylic type resin, a homopolymer or a copolymer of vinyl nitrile compounds (acrylonitrile, methacrylonitrile, and the like), carboxymethyl cellulose, hydroxyalkyl cellulose, polyvinyl alcohol, polyvinyl butyral, polyvinyl pyrrolidone, polyether (polyethylene oxide, polypropylene oxide, and the like), and the like.

The content of the other resins other than the polyvinylidene fluoride type resin contained in the heat-resistant porous layer is preferably 50% by mass or less, more preferably 30% by mass or less, and still more preferably 10% by mass or less with respect to the total amount of the binder resin contained in the heat-resistant porous layer.

—Filler—

The separator of the present disclosure contains a filler in the heat-resistant porous layer. The average primary particle diameter of the filler contained in the heat-resistant porous layer is from 0.01 μm to 1.0 μm.

The average primary particle diameter of the filler contained in the heat-resistant porous layer is 1.0 μm or less, more preferably 0.8 μm or less, and still more preferably 0.5 μm or less from the viewpoint of suppressing the shrinkage of the heat-resistant porous layer when exposed to a high temperature and from the viewpoint of being advantageous for thinning the heat-resistant porous layer.

The average primary particle diameter of the filler contained in the heat-resistant porous layer is 0.01 μm or more, more preferably 0.02 μm or more, and still more preferably 0.03 μm or more from the viewpoint of suppressing the aggregation of the fillers to form the heat-resistant porous layer having high uniformity.

The average primary particle diameter of the filler can be determined by measuring the major diameters of 100 filler particles randomly selected by observation with a scanning electron microscope (SEM), and averaging major diameters of 100 filler particles. When the primary particle diameter of the filler is small and it is difficult to measure the major diameter of the filler, and/or when the aggregation of the filler is remarkable and the major diameter of the filler cannot be measured, a BET specific surface area ($m^2/g$) of the filler is measured, and the average primary particle diameter can be determined according to the following formula assuming that the filler is a true sphere.

$$\text{Average primary particle diameter}(\mu m)=6\div[\text{specific gravity}(g/cm^3)\times BET\ \text{specific surface area}(m^2/g)]$$

The BET specific surface area ($m^2/g$) is determined by a BET multipoint method in a gas adsorption method using nitrogen gas. In the measurement by the gas adsorption method, the nitrogen gas is adsorbed to the filler at a boiling point (−196° C.) of liquid nitrogen.

The sample that is used for the SEM observation or the measurement of the BET specific surface area is a filler which is a material for forming the heat-resistant porous layer, or a filler taken out from the heat-resistant porous layer of the separator. The method of taking out a filler from a heat-resistant porous layer of a separator is not limited, and examples thereof include a method in which the heat-resistant porous layer peeled off from the separator is immersed in an organic solvent in which the polyvinylidene fluoride type resin is dissolved but the organic filler is not dissolved, and the polyvinylidene fluoride type resin is dissolved with the organic solvent to take out the inorganic filler and the organic filler. When the filler is only the inorganic filler, the heat-resistant porous layer peeled off from the separator may be heated to about 800° C. to disappear the binder resin, and the filler may be taken out.

The particle shape of the filler is not limited, and may be any of a spherical shape, an elliptical shape, a plate shape, a needle shape, and an amorphous shape. The filler contained in the heat-resistant porous layer is preferably plate-shaped or spherical particles or primary particles that are not aggregated, from the viewpoint of suppressing short circuit of the battery or from the viewpoint of easily filling the filler densely.

A volume ratio of the filler in the heat-resistant porous layer is preferably 30% by volume or more, more preferably 40% by volume or more, and still more preferably 50% by volume or more from the viewpoint of the heat resistance of the separator. The volume ratio of the filler in the heat-resistant porous layer is preferably 90% by volume or less, more preferably 80% by volume or less, and still more preferably 75% by volume or less from the viewpoint of the moldability of the heat-resistant porous layer and the viewpoint that the heat-resistant porous layer is hardly peeled off from the porous substrate.

The volume ratio of the polyvinylidene fluoride type resin and the filler (polyvinylidene fluoride type resin:filler) contained in the heat-resistant porous layer is preferably from 10:90 to 70:30, more preferably from 15:85 to 65:35, and still more preferably from 20:80 to 60:40.

The filler contained in the heat-resistant porous layer may be any of an inorganic filler, an organic filler, and a mixture of the inorganic filler and the organic filler. The fillers may be used singly or in combination of two or more kinds thereof.

The filler contained in the heat-resistant porous layer is preferably a filler that is stable to an electrolytic solution and is electrochemically stable.

Examples of the inorganic filler include particles of metal hydroxides such as magnesium hydroxide, aluminum hydroxide, calcium hydroxide, chromium hydroxide, zirconium hydride, cerium hydroxide, nickel hydroxide, and boron hydroxide; particles of metal oxides such as magnesium oxide, alumina, boehmite (alumina monohydrate), titania, silica, zirconia, barium titanate, and zinc oxide; particles of metal carbonates such as magnesium carbonate and calcium carbonate; particles of metal sulfates such as barium sulfate, magnesium sulfate and calcium sulfate; particles of metal nitrides such as magnesium nitride, aluminum nitride, calcium nitride, titanium nitride; metal fluorides such as magnesium fluoride and calcium fluoride; clay minerals such as calcium phosphate, apatite, calcium silicate, and talc, and the like. The inorganic filler may be surface-modified with a silane coupling agent or the like. These inorganic fillers may be used singly or in combination of two or more kinds thereof.

Among the inorganic fillers, at least one selected from the group consisting of metal sulfate particles, metal hydroxide particles, metal oxide particles, and metal nitride particles is preferable from the viewpoint of the stability to the electrolytic solution and the electrochemical stability. Furthermore, metal sulfate particles are preferable from the viewpoint of hardly decomposing the electrolytic solution or the electrolyte and thus hardly generating gas in the battery.

Examples of the metal sulfate particles include particles of barium sulfate ($BaSO_4$), particles of strontium sulfate ($SrSO_4$), particles of calcium sulfate ($CaSO_4$), particles of calcium sulfate dihydrate ($CaSO_4.2H_2O$), particles of alunite ($KAl_3(SO_4)_2(OH)_6$), and particles of jalosite ($KFe_3(SO_4)_2(OH)_6$). Among them, particles of barium sulfate ($BaSO_4$) are most preferable. The metal sulfate particles may be used singly or in combination of two or more kinds thereof.

—Organic Filler—

Examples of the organic filler include particles of a crosslinked polymer such as crosslinked poly (meth)acrylic acid, crosslinked poly (meth)acrylate, crosslinked polysilicone, crosslinked polystyrene, crosslinked polydivinylbenzene, a styrene-divinylbenzene copolymer crosslinked product, a melamine resin, a phenol resin, or a benzoguanamine-formaldehyde condensate; and particles of a heat resistant polymer such as polysulfone, polyacrylonitrile, aramid, or polyacetal. These organic fillers may be used singly or in combination of two or more kinds thereof.

—Other Components—

In the separator of the present disclosure, the heat-resistant porous layer may contain an additive, for example, a dispersant such as a surfactant, a wetting agent, an antifoaming agent, or a pH adjuster. The dispersant is added to a coating liquid for forming a heat-resistant porous layer for the purpose of improving dispersibility, coatability, or storage stability. The wetting agent, the antifoaming agent, or the pH adjuster is added to a coating liquid for forming a heat-resistant porous layer for the purpose of, for example, improving compatibility with the porous substrate, suppressing mixing of air into the coating liquid, or adjusting the pH.

[Characteristics of Heat-Resistant Porous Layer]

The thickness of the heat-resistant porous layer is preferably 0.5 μm or more per one side and more preferably 1.0 μm or more per one side from the viewpoint of heat resistance or adhesiveness to an electrode of the separator, and is preferably 5.0 μm or less per one side, and more preferably 4.0 μm or less per one side from the viewpoint of ion permeability or energy density of a battery.

The thickness of the heat-resistant porous layer is preferably 1.0 μm or more, more preferably 2.0 μm or more, and preferably 10.0 μm or less, more preferably 8.0 μm or less as the total thickness of both sides, even when the heat-resistant porous layer is provided on only one side or both sides of the porous substrate.

When the heat-resistant porous layer is provided on both sides of the porous substrate, the difference between the thickness of the heat-resistant porous layer on one side of the porous substrate and the thickness of the heat-resistant porous layer on the other side of the porous substrate is preferably 25% or less of the total thickness of both sides, and the lower the difference, the more preferable.

The mass per unit area of the heat-resistant porous layer is preferably 1.0 $g/m^2$ or more, more preferably 2.0 $g/m^2$ or more, still more preferably 3.5 $g/m^2$ or more, further still more preferably 4.0 $g/m^2$ or more, and further still more preferably 4.5 $g/m^2$ or more as a total of both sides from the viewpoint of heat resistance and adhesiveness to an electrode of the separator, and is preferably 30.0 $g/m^2$ or less, more preferably 20.0 $g/m^2$ or less, still more preferably 10.0 $g/m^2$ or less, and further still more preferably 8.0 $g/m^2$ or less as a total of both sides from the viewpoint of ion permeability or energy density of a battery.

When the heat-resistant porous layer is provided on both sides of the porous substrate, the difference in mass between one side and the other side of the heat-resistant porous layer is preferably 25% by mass or less with respect to the total mass of both sides from the viewpoint of suppressing the curling of the separator or improving the cycle characteristics of the battery.

The porosity of the heat-resistant porous layer is preferably 30% or more, more preferably 40% or more, and still more preferably 50% or more from the viewpoint of the ion permeability, and is preferably 90% or less, more preferably 80% or less, and still more preferably 70% or less from the viewpoint of the mechanical strength of the heat-resistant porous layer and the adhesiveness to the electrode. The porosity ε (%) of the heat-resistant porous layer is obtained by the following formula.

$$\varepsilon=\{1-(Wa/da+Wb/db+Wc/dc+\ldots+Wn/dn)/t\}\times 100$$

Here, the constituent materials of the heat-resistant porous layer are a, b, c, . . . , and n, the masses of the constituent materials are Wa, Wb, Wc, . . . , and Wn ($g/cm^2$), the true densities of the constituent materials are da, db, dc, . . . , and dn ($g/cm^3$), and the thickness of the heat-resistant porous layer is t (cm).

The average pore size of the heat-resistant porous layer is preferably 10 nm or more, and more preferably 20 nm or more from the viewpoint that the pores are less likely to be blocked even if the resin contained in the heat-resistant porous layer swells when the heat-resistant porous layer is impregnated with the electrolytic solution, and is preferably 300 nm or less, and more preferably 200 nm or less from the viewpoint of the adhesiveness of the heat-resistant porous layer to the electrode or from the viewpoint of the excellent cycle characteristics and load characteristics of the battery.

The average pore size (nm) of the heat-resistant porous layer is calculated by the following formula, assuming that all pores are cylindrical.

$$d=4V/S$$

In the formula, d represents an average pore size (diameter) of the heat-resistant porous layer, V represents a pore volume per square meter of the heat-resistant porous layer, and S represents a pore surface area per square meter of the heat-resistant porous layer.

The pore volume V per square meter of the heat-resistant porous layer is calculated from the porosity of the heat-resistant porous layer.

The pore surface area S per square meter of the heat-resistant porous layer is determined by the following method.

First, a specific surface area ($m^2/g$) of the porous substrate and a specific surface area ($m^2/g$) of the separator are calculated from a nitrogen gas adsorption amount by applying a BET formula to a nitrogen gas adsorption method. These specific surface areas ($m^2/g$) are multiplied by basis weights ($g/m^2$) of the porous substrate and the separator, respectively, to calculate a pore surface area per square meter. Then, the pore surface area per square meter of the porous substrate is subtracted from the pore surface area per square meter of the separator to calculate the pore surface area S per square meter of the heat-resistant porous layer.

[Characteristics of Separator]

The thickness of the separator of the present disclosure is preferably 5 μm or more, and more preferably 10 μm or more from the viewpoint of the mechanical strength of the separator, and is preferably 35 μm or less, more preferably 30 μm or less, still more preferably 25 μm or less, and still further more preferably 20 μm or less from the viewpoint of the energy density of the battery.

The puncture strength of the separator of the present disclosure is preferably from 160 gf (1.6N) to 1000 gf (9.8N), and more preferably from 200 gf (2.0N) to 600 gf (5.9N) from the viewpoint of the mechanical strength of the separator or the short circuit resistance of the battery. The method of measuring the puncture strength of the separator is the same as the method of measuring the puncture strength of the porous substrate.

The porosity of the separator of the present disclosure is preferably from 30% to 65%, and more preferably from 30% to 60% from the viewpoint of the adhesiveness to the electrode, the handleability of the separator, the ion permeability, or the mechanical strength.

The Gurley value (JIS P8117: 2009) of the separator of the present disclosure is preferably from 50 seconds/100 mL to 800 seconds/100 mL, and more preferably from 50 seconds/100 mL to 450 seconds/100 mL from the viewpoint of mechanical strength and load characteristics of the battery.

The separator of the present disclosure has, as a value obtained by subtracting a Gurley value of the porous substrate from a Gurley value of the separator, preferably 300 seconds/100 mL or less, more preferably 150 seconds/100 mL or less, still more preferably 100 seconds/100 mL or less from the viewpoint of ion permeability. A lower limit of the value obtained by subtracting a Gurley value of the porous substrate from a Gurley value of the separator is not particularly limited, but is usually 10 seconds/100 mL or more in the separator of the present disclosure.

The separator of the present disclosure preferably has a film resistance of from 1 $\Omega\cdot cm^2$ to 10 $\Omega\cdot cm^2$ from the viewpoint of load characteristics of a battery. Here, the film resistance of the separator refers to a resistance value in a state where the separator is impregnated with an electrolytic solution, and is measured by an AC method at temperature 20° C. using 1 mol/L $LiBF_4$-propylene carbonate:ethylene carbonate (mass ratio 1:1) as the electrolytic solution. The separator with a lower film resistance value has better ion permeability.

The separator of the present disclosure preferably has a tortuosity ratio of from 1.2 to 2.8 from the viewpoint of ion permeability.

The amount of water (based on mass) contained in the separator of the present disclosure is preferably 1000 ppm or less. With a smaller amount of water in the separator, a reaction between an electrolytic solution and water can be suppressed, and generation of gas in a battery can be suppressed to improve the cycle characteristics of the battery in a case where the battery is formed. The amount of water contained in the separator is more preferably 800 ppm or less, and still more preferably 500 ppm or less from this viewpoint.

The separator of the present disclosure has a shrinkage ratio, when heat-treated at 120° C., of preferably 12% or less in an MD direction and in a TD direction from the viewpoint of a balance between morphological stability and shutdown characteristics.

The separator of the present disclosure has a shrinkage ratio, when heat-treated at 135° C. for 1 hour, in an MD direction of preferably 40% or less, more preferably 30% or less, still more preferably 20% or less, still more preferably 15% or less, still more preferably 10% or less, and particularly preferably 0%.

The separator of the present disclosure has a shrinkage ratio, when heat-treated at 135° C. for 1 hour, in a TD direction of preferably 40% or less, more preferably 30% or less, still more preferably 20% or less, still more preferably 15% or less, still more preferably 10% or less, and particularly preferably 0%.

The separator of the present disclosure has an area shrinkage ratio, when heat-treated at 135° C. for 1 hour, of preferably 40% or less, more preferably 30% or less, still more preferably 20% or less, still more preferably 15% or less, still more preferably 10% or less, and particularly preferably 0%.

The separator of the present disclosure has a shrinkage ratio, when heat-treated at 150° C. for 1 hour, in an MD direction of preferably 70% or less, more preferably 55% or less, still more preferably 45% or less, still more preferably 20% or less, and still more preferably 10% or less.

The separator of the present disclosure has a shrinkage ratio, when heat-treated at 150° C. for 1 hour, in a TD direction of preferably 70% or less, more preferably 55% or less, still more preferably 45% or less, still more preferably 20% or less, and still more preferably 10% or less.

The separator of the present disclosure has an area shrinkage ratio, when heat-treated at 150° C. for 1 hour, of preferably 70% or less, more preferably 55% or less, still more preferably 45% or less, still more preferably 20% or less, and still more preferably 10% or less.

The area shrinkage ratio when the separator is heated at 135° C. or 150° C. for one hour is determined by the following measuring method.

The separator is cut out into a rectangle of 180 mm in an MD direction×60 mm in a TD direction to prepare a test piece. This test piece is marked at points of 20 mm and 170 mm from one end on a line bisecting the test piece in the TD direction (referred to as points A and B, respectively). Furthermore, the test piece is marked at points of 10 mm and 50 mm from one end on a line bisecting the test piece in the MD direction (referred to as points C and D, respectively). A clip is attached to the marked test piece (a point where the clip is attached is between the point A and an end closest to the point A). The test piece is hung in an oven in which the temperature is adjusted to 135° C. or 150° C. to be heated under no tension for one hour. A length between A and B and a length between C and D are measured before and after the heat treatment, and an area shrinkage ratio is calculated by the following formula.

$$\text{Area shrinkage ratio (\%)}=\{1-(\text{length between } A \text{ and } B \text{ after heat treatment} \div \text{length between } A \text{ and } B \text{ before heat treatment})\times(\text{length between } C \text{ and } D \text{ after heat treatment} \div \text{length between } C \text{ and } D \text{ before heat treatment})\}\times 100$$

The shrinkage ratio of the separator of the present disclosure at the time of the heat treatment can be controlled by, for example, the content of the filler in the heat-resistant porous layer, the thickness of the heat-resistant porous layer, or the porosity of the heat-resistant porous layer.

The separator of the present disclosure may further include other layers other than the porous substrate and the heat-resistant porous layer. Examples of the form further including other layers include a form in which a heat-resistant porous layer is provided on one side of the porous substrate, and an adhesive porous layer is provided on the other side of the porous substrate mainly for adhesion to an electrode.

[Method of Producing Separator]

The separator of the present disclosure can be produced, for example, by forming the heat-resistant porous layer on the porous substrate by a wet coating method or a dry coating method. In the present disclosure, the wet coating method is a method of solidifying a coating layer in a coagulation liquid, and the dry coating method is a method of drying a coating layer to solidify the coating layer.

Hereinafter, embodiment examples of the wet coating method will be described. In the following description, the PVDF type resin A and the PVDF type resin B will be collectively referred to as binder resins.

The wet coating method is a method of applying a coating liquid containing a binder resin and a filler onto a porous substrate, immersing the resulting product in a coagulation liquid to solidify the coating layer, pulling the resulting product out of the coagulation liquid, washing the resulting product with water, and drying the resulting product.

The coating liquid for forming the heat-resistant porous layer is prepared by dissolving or dispersing a binder resin and a filler in a solvent. In the coating liquid, a component other than the binder resin and the filler is dissolved or dispersed, if necessary.

A solvent used for preparing the coating liquid includes a solvent that dissolves the binder resin (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and from 5% by mass to 40% by mass of the phase separation agent from the viewpoint of forming a favorable porous structure.

The binder resin concentration of the coating liquid is preferably from 3% by mass to 10% by mass from the viewpoint of forming a favorable porous structure. The filler concentration of the coating liquid is preferably from 2% by mass to 50% by mass from the viewpoint of forming a favorable porous structure.

The coating liquid may contain a dispersant such as a surfactant, a wetting agent, an antifoaming agent, or a pH adjuster. These additives may be those remain in the heat-resistant porous layer as long as the additives are electrochemically stable in the range of use of a non-aqueous secondary battery and do not inhibit the reaction in the battery.

Examples of a means of applying the coating liquid to the porous substrate include a Meyer bar, a die coater, a reverse roll coater, a roll coater, and a gravure coater. In a case where the heat-resistant porous layers are formed on both sides of the porous substrate, it is preferable to simultaneously apply the coating liquid to both sides of the porous substrate from the viewpoint of productivity.

The coating layer is solidified by immersing the porous substrate on which the coating layer is formed in a coagulation liquid, and solidifying the binder resin while phase separation is induced in the coating layer. As a result, a laminated body composed of the porous substrate and the heat-resistant porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the laminated body is pulled out of the coagulation liquid and washed with water. By washing the laminated body with water, the coagulation liquid is removed from the laminated body. Furthermore, by drying the laminated body, water is removed from the laminated body. Washing with water is performed, for example, by transporting the laminated body in a water washing bath. Drying is performed, for example, by transporting the laminated body in a high-temperature environment, blowing air to the laminated body, or bringing the laminated body into contact with a heat roll. The drying temperature is preferably from 40° C. to 80° C.

The separator of the present disclosure can also be produced by a dry coating method. The dry coating method is a method of applying a coating liquid onto a porous substrate, drying the coating layer to remove a solvent by evaporation, and thereby forming a heat-resistant porous layer on the porous substrate. However, since the porous layer tends to be dense in the dry coating method as compared with the wet coating method, the wet coating method is more preferable from the viewpoint of obtaining a favorable porous structure.

The separator of the present disclosure can also be produced by a method of preparing a heat-resistant porous layer as an independent sheet, stacking the heat-resistant porous layer on a porous substrate, and forming a composite by thermal press bonding or an adhesive. Examples of the method of preparing a heat-resistant porous layer as an independent sheet include a method of forming a heat-resistant porous layer on a release sheet by applying the above-described wet coating method or dry coating method.

<Non-Aqueous Secondary Battery>

A non-aqueous secondary battery of the present disclosure is a non-aqueous secondary battery that obtains an electromotive force by doping/dedoping lithium, and includes a positive electrode, a negative electrode, and a separator for a non-aqueous secondary battery of the present disclosure. The doping means occlusion, support, adsorption, or insertion, and means a phenomenon that lithium ions enter an active material of an electrode such as a positive electrode.

The non-aqueous secondary battery of the present disclosure has a structure in which, for example, a battery element in which a negative electrode and a positive electrode face each other with a separator interposed therebetween is enclosed in an exterior material together with an electrolytic solution. The non-aqueous secondary battery of the present disclosure is suitable for a non-aqueous electrolyte secondary battery, particularly for a lithium ion secondary battery.

In the non-aqueous secondary battery of the present disclosure, since the separator of the present disclosure is excellent in adhesion to the electrode by the dry heat press, the production yield can be improved.

The active material layer of the electrode preferably contains a large amount of binder resin from the viewpoint of the adhesiveness to the separator, and preferably contains a large amount of active material and has a relatively small amount of binder resin from the viewpoint of increasing the energy density of the battery. Since the separator of the present disclosure is excellent in adhesion to the electrode, the amount of binder resin in the active material layer can be reduced to increase the amount of active material, and thus the energy density of the battery can be increased.

Hereinafter, aspect examples of the positive electrode, negative electrode, electrolyte solution, and exterior material included in the non-aqueous secondary battery according to the present disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer.

Examples of the conductive auxiliary agent include carbon materials such as acetylene black, Ketjen black, and graphite powder.

Examples of the current collector include an aluminum foil, a titanium foil, and a stainless steel foil, each having a thickness of from 5 μm to 20 μm.

In the non-aqueous secondary battery according to the present disclosure, since a polyvinylidene fluoride type resin, which is included in the heat-resistant porous layer of the separator according to the present disclosure, has excellent oxidation resistance, when the heat-resistant porous layer is disposed by contacting the positive electrode of the non-aqueous secondary battery, a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, can be easily applicable.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, graphite powder, and extra fine carbon fiber. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the present disclosure is suitable for any one of these shapes.

Examples of the method for producing a non-aqueous secondary battery of the present disclosure include a production method including a process of bonding a separator to an electrode by dry heat press, and a sealing process of sealing the electrode and the separator bonded to each other inside an exterior material together with an electrolytic solution.

More specifically, the above production method includes a laminating process of producing a laminated body in which the separator of the present disclosure is disposed between the positive electrode and the negative electrode, a dry adhesion process of performing the dry heat pressing on the laminated body to bond at least one of the positive electrode and the negative electrode to the separator, and a sealing process of sealing the laminated body subjected to the dry adhesion process inside the exterior material together with the electrolytic solution.

The laminating process is, for example, a process of disposing the separator of the present disclosure between the positive electrode and the negative electrode, a process of winding the separator in the length direction to produce a wound body, or a process of laminating the positive electrode, the separator, and the negative electrode by at least one layer in this order.

The dry adhering process may be carried out before the laminated body is stored in the outer packaging material (e.g. a pack made of an aluminum laminate film), or after the laminated body is stored in the outer packaging material. That is, the laminated body in which the electrode and the separator are adhered to each other by dry heat press may be stored in the outer packaging material, or the electrode and the separator may be adhered to each other by performing dry heat press from above the outer packaging material after storage of the laminated body in the outer packaging material.

The pressing temperature in the dry adhering process is preferably from 30° C. to 100° C. When the pressing temperature is in the above-mentioned range, the electrode and the separator are favorably adhered to each other, and the separator can be moderately expanded in a transverse direction, so that a short-circuit of the battery hardly occurs. The press pressure in the dry adhering process is preferably from 0.2 MPa to 9 MPa. Preferably, the pressing time is adjusted according to the pressing temperature and the press pressure. For example, the pressing time is adjusted to fall within a range of 0.1 minutes to 60 minutes.

The laminated body may be temporarily adhered by subjecting the laminated body to room temperature press at normal temperature (pressurization at normal temperature) after the lamination process and prior to the dry adhering process.

The sealing process is a process of sealing an opening of the exterior material after injecting the electrolytic solution into the exterior material in which the laminated body is housed. The opening of the exterior material is sealed by, for example, bonding the opening of the exterior material with an adhesive or thermocompression-bonding the opening of the exterior material by heating and pressurization. It is preferable to bring the inside of the exterior body into a vacuum state before sealing the opening of the exterior material.

In the sealing process, it is preferable that the opening of the exterior material is thermocompression-bonded by heating and pressurization, and at the same time, the laminated body is heat-pressed from above the exterior material. By performing the hot pressing treatment (wet heat press) in a state where the laminated body and the electrolytic solution coexist, the adhesion between the electrode and the separator is further strengthened.

As the conditions of the wet heat press, the pressing temperature is preferably from 60° C. to 90° C., and the pressing pressure is preferably from 0.2 MPa to 2 MPa. The pressing time is preferably adjusted according to the pressing temperature and the pressing pressure, and is adjusted, for example, in a range of from 0.5 minutes to 60 minutes.

EXAMPLES

Hereinafter, the separator and the non-aqueous secondary battery of the present disclosure will be described more specifically with reference to Examples. Materials, used amounts, ratios, treatment procedures, and the like illustrated in the following Examples can be changed, if appropriate without departing from the spirit of the present disclosure. Therefore, the range of the separator and the non-aqueous secondary battery of the present disclosure should not be construed as being limited by the specific examples described below.

<Measurement Method and Evaluation Method>

The measurement methods and evaluation methods applied in the examples of the invention and comparative examples are as follows.

[Melting Point of Polyvinylidene Fluoride Type Resin]

The melting point of the polyvinylidene fluoride type resin is determined from a differential scanning calorimetry curve (DSC curve) obtained by performing differential scanning calorimetry (DSC). Specifically, the porous layer was peeled off from the porous substrate, and the filler was removed from the peeled porous layer to obtain the polyvinylidene fluoride type resin. The polyvinylidene fluoride type resin was placed in a sample chamber of a differential scanning calorimeter (Q series manufactured by TA Instruments), and heated in a range of from 30° C. to 200° C. at a rate of 5° C./min under a nitrogen atmosphere to obtain the DSC curve. The temperature of the endothermic peak appearing in the DSC curve was defined as the melting point of the polyvinylidene fluoride type resin. When there were a plurality of endothermic peaks, the temperature of the endothermic peak on the lowest temperature side was defined as the melting point.

[Weight Average Molecular Weight of Polyvinylidene Fluoride Type Resin]

The weight average molecular weight (Mw) of the polyvinylidene fluoride type resin was measured by gel permeation chromatography (GPC). The molecular weight was measured by GPC using a GPC device "GPC-900" manufactured by JASCO Corporation, using two columns of TSKgel SUPER AWM-H manufactured by Tosoh Corporation, using N, N-dimethylformamide for a solvent, under conditions that temperature was 40° C. and a flow rate was 0.6 mL/min to obtain a molecular weight in terms of polystyrene.

[Average Primary Particle Diameter of Filler]

The inorganic filler before being added to the coating liquid for forming the heat-resistant porous layer was used as a sample.

The average primary particle diameter of the magnesium hydroxide particles was determined by measuring the major diameters of 100 magnesium hydroxide particles randomly selected in observation with a scanning electron microscope (SEM), and averaging the major diameters of 100 magnesium hydroxide particles.

Since it was difficult to measure the major diameters of the primary particles of the prepared barium sulfate particles by the SEM, the specific gravity (g/cm$^3$) and the BET specific surface area (m$^2$/g) of the barium sulfate particles were measured, and the average primary particle diameter of the barium sulfate particles was determined according to the following formula assuming that the barium sulfate particles were spherical. As an apparatus for measuring the BET specific surface area, ASAP 2020 manufactured by Micromeritics was used.

$$\text{Average primary particle diameter}(\mu m)=6\div[\text{specific gravity}(g/cm^3)\times BET\ \text{specific surface area}(m^2/g)]$$

[Volume Ratio of Filler Occupied in Heat-Resistant Porous Layer]

The volume ratio Va (%) of the filler occupied in the heat-resistant porous layer was determined by the following formula.

$$Va=\{(Xa/Da)/(Xa/Da+Xb/db+Xc/Dc+\ldots+Xn-1/Dn-1+Xn/Dn)\}\times 100$$

Here, among the constituent materials of the heat-resistant porous layer, the fillers are a, b, c, . . . , the constituent materials (PVDF type resin and the like) other than the fillers are n−1, n, the masses of the constituent materials are Xa, Xb, Xc, . . . , Xn−1, Xn (g), and the true densities of the constituent materials are Da, db, Dc, . . . , Dn−1, Dn (g/cm$^3$).

[Thickness of Porous Substrate and Separator]

The thicknesses (μm) of the porous substrate and the separator were determined by measuring 20 points within a 10 cm square using a contact type thickness meter (Mitutoyo Corporation, LITEMATIC VL-50) and averaging the measured values. The measurement terminal used was a cylindrical terminal with a diameter of 5 mm, and was adjusted so that a load of 0.01 N was applied during the measurement.

[Layer Thickness of Heat-Resistant Porous Layer]

The layer thickness (μm) of the heat-resistant porous layer was determined by subtracting the thickness (μm) of the porous substrate from the thickness (μm) of the separator.

[Coating Amount of Heat-Resistant Porous Layer]

The separator was cut into a 10 cm×10 cm square, and the mass was measured and divided by the area to determine the basis weight of the separator. In addition, the porous substrate used for preparing the separator was cut into a 10 cm×10 cm square, the mass was measured, and the mass was divided by the area to determine the basis weight of the porous substrate. Then, the total coating amount of both sides of the heat-resistant porous layer was obtained by subtracting the basis weight of the porous substrate from the basis weight of the separator.

[Gurley Value]

The Gurley value (sec/100 ml) of each of the porous substrate and the separator was measured with a Gurley type densometer (manufactured by Toyo Seiki Seisaku-sho, Ltd.) in accordance with JIS P8117 (2009).

[Porosity of Porous Substrate]

The porosity ε (%) of the porous substrate was determined by the following formula.

$$\varepsilon=\{1-(Wa/da+Wb/db+Wc/dc+\ldots+Wn/dn)/t\}\times 100$$

Here, the constituent materials of the porous substrate are represented by a, b, n, the mass of each constituent material is Wa, Wb, Wc, . . . , or Wn ($g/cm^2$), the true density of each constituent material is represented by da, db, dc, . . . , or dn ($g/cm^3$), and the thickness of the heat-resistant porous layer is represented by t (cm).

[Porosity of Heat-Resistant Porous Layer]

The porosity ε (%) of the heat-resistant porous layer was determined by the following formula.

$$\varepsilon=\{1-(Wa/da+Wb/db+Wc/dc+\ldots+Wn/dn)/t\}\times 100$$

Here, the constituent materials of the heat-resistant porous layer are represented by a, b, c, . . . , n, the mass of each constituent material is Wa, Wb, Wc, . . . , or Wn ($g/cm^2$), the true density of each constituent material is represented by da, db, dc, . . . , or dn ($g/cm^3$), and the thickness of the heat-resistant porous layer is represented by t (cm).

[Area Shrinkage Ratio by Heat Treatment]

The separator was cut out into a size of 180 mm in an MD direction×60 mm in a TD direction to prepare a test piece. This test piece was marked at points of 20 mm and 170 mm from one end on a line bisecting the test piece in the TD direction (referred to as points A and B, respectively). Furthermore, the test piece was marked at points of 10 mm and 50 mm from one end on a line bisecting the test piece in the MD direction (referred to as points C and D, respectively). A clip was attached to the test piece (a point where the clip was attached was between the point A and an end closest to the point A). The test piece was hung in an oven in which the temperature was adjusted to 135° C. to be heated under no tension for one hour. A length between A and B and a length between C and D were measured before and after the heat treatment, and an area shrinkage ratio was calculated by the following formula. Furthermore, the area shrinkage ratios of the ten test pieces were averaged.

$$\text{Area shrinkage ratio (\%)}=\{1-(\text{length between } A \text{ and } B \text{ after heat treatment}\div\text{length between } A \text{ and } B \text{ before heat treatment})\times(\text{length between } C \text{ and } D \text{ after heat treatment}\div\text{length between } C \text{ and } D \text{ before heat treatment})\}\times 100$$

[Adhesive Strength to Electrode During Dry Heat Press]

300 g of artificial graphite as a negative electrode active material, 7.5 g of a water-soluble dispersion containing 40% by mass of a modified product of a styrene-butadiene copolymer as a binder, 3 g of carboxymethyl cellulose as a thickener, and an appropriate amount of water were stirred and mixed by a double arm mixer to prepare a negative electrode slurry. The negative electrode slurry was applied to one side of a copper foil having a thickness of 10 μm, dried, and then pressed to obtain a negative electrode having a negative electrode active material layer.

The negative electrode obtained above was cut into a width of 15 mm and a length of 70 mm, and the separator was cut into a rectangle of 18 mm in a TD direction×74 mm in an MD direction. A release paper having a width of 15 mm and a length of 70 mm was prepared. The laminated body in which the negative electrode, the separator, and the release paper were stacked in this order was inserted into a pack made of an aluminum laminate film, and was hot-pressed together with the pack in the stacking direction of the laminated body using a hot pressing machine, thereby bonding the negative electrode and the separator. The conditions for the hot pressing were a temperature of 90° C., a pressure of 9 MPa, and a time of 10 seconds. Thereafter, the laminated body was taken out from the pack, and the release paper was peeled off to obtain a test piece.

The non-coated surface of the negative electrode of the test piece was fixed to a metal plate with a double-sided tape, and the metal plate was fixed to a lower chuck of Tensilon (A & D Company, STB-12255). In this case, the metal plate was fixed to the Tensilon such that the length direction of the test piece (that is, the MD direction of the separator) was the gravity direction. The separator was peeled off from the negative electrode by about 2 cm from the lower end, the end portion thereof was fixed to the upper chuck, and a 180° peeling test was performed. The tensile speed in the 180° peel test was set to 20 mm/min, a load (N) from 10 mm to 40 mm after the start of the measurement was taken at 0.4 mm intervals, and the average thereof was calculated. Further, a load of 10 test pieces was averaged to determine the adhesive strength (N/15 mm) between the electrode and the separator.

<Production of Separator>

Example 1

As a PVDF type resin A, a VDF-TFE copolymer having a melting point (Tm) of 132° C. and a weight average molecular weight (Mw) of 1,300,000 was prepared.

As the PVDF type resin B, a VDF-HFP copolymer having a melting point (Tm) of 152° C. and a weight average molecular weight (Mw) of 1,130,000 was prepared.

The PVDF type resin A and the PVDF type resin B were dissolved in a mixed solvent of dimethylacetamide (DMAc) and tripropylene glycol (TPG) (DMAc:TPG=80:20 [mass ratio]), and an inorganic filler (barium sulfate particles and average primary particle diameter 0.05 μm) was further dispersed to obtain a coating liquid 1. In the coating liquid 1, the mass ratio of the PVDF type resin A to the PVDF type resin B (PVDF type resin A:PVDF type resin B) is 50:50, the concentration of the polyvinylidene fluoride type resin is 5% by mass, and the volume ratio of the polyvinylidene fluoride type resin to the filler (polyvinylidene fluoride type resin: filler) is 39:61.

The coating liquid 1 was applied to both sides of a polyethylene microporous film (thickness 9.1 μm, Gurley value 157 seconds/100 mL, and porosity 36%) (in this case, coating was performed so that the coating amounts on the front and back surfaces were equal). This was immersed in a coagulation liquid (Water:DMAc:TPG=62:30:8 [mass ratio], liquid temperature 40° C.) to solidify the coating layer, then washed with water, and dried. In this way, a separator in which a heat-resistant porous layer was formed on both sides of a polyethylene microporous film was obtained. The coating amount of the heat-resistant porous layer was about 6 $g/m^2$ on both sides in total.

Example 2

A separator was prepared in the same manner as in Example 1 except that the coating amount of the heat-resistant porous layer was changed as shown in Table 1.

Examples 3 and 4

A separator was prepared in the same manner as in Example 1 except that the PVDF type resin B was changed to another PVDF type resin B (VDF-HFP copolymer, and Tm and Mw are as shown in Table 1).

Examples 5 and 6

A separator was prepared in the same manner as in Example 1 except that barium sulfate particles were changed to other barium sulfate particles (the average primary particle diameter is as shown in Table 1).

Examples 7 to 10

A separator was prepared in the same manner as in Example 1 except that the PVDF type resin A was changed to another PVDF type resin A (VDF-TFE copolymer, and Tm and Mw are as shown in Table 1).

Example 11

A separator was prepared in the same manner as in Example 1 except that the PVDF type resin B was changed to another PVDF type resin B (VDF homopolymer, and Tm and Mw are as shown in Table 1).

Comparative Example 1

In the same manner as in Example 1, however, PVDF type resin A was not used, and PVDF type resin B was increased by that amount to produce a separator.

Example 12

As a PVDF type resin A, a VDF-TFE copolymer having a melting point (Tm) of 132° C. and a weight average molecular weight (Mw) of 1,300,000 was prepared.

As the PVDF type resin B, a VDF-HFP copolymer having a melting point (Tm) of 131° C. and a weight average molecular weight (Mw) of 340,000 was prepared.

PVDF type resin A and PVDF type resin B were dissolved in a mixed solvent of DMAc and TPG (DMAc:TPG=80:20 [mass ratio]), and an inorganic filler (Magnesium hydroxide particles, average primary particle diameter 0.8 μm) was further dispersed to obtain a coating liquid 12. In the coating liquid 12, the mass ratio of the PVDF type resin A to the PVDF type resin B (PVDF type resin A:PVDF type resin B) was 50:50, the concentration of the polyvinylidene fluoride type resin was 5% by mass, and the volume ratio of the polyvinylidene fluoride type resin to the filler (polyvinylidene fluoride type resin:filler) was 47:53.

The coating liquid 12 was applied to both sides of a polyethylene microporous film (thickness 9.1 μm, Gurley value 157 seconds/100 mL, and porosity 36%) (in this case, coating was performed so that the coating amounts on the front and back surfaces were equal). This was immersed in a coagulation liquid (Water:DMAc:TPG=62:30:8 [mass ratio], liquid temperature 40° C.) to solidify the coating layer, then washed with water, and dried. In this way, a separator in which a heat-resistant porous layer was formed on both sides of a polyethylene microporous film was obtained. The coating amount of the heat-resistant porous layer was about 3 $g/m^2$ on both sides in total.

Examples 13 and 14

A separator was produced in the same manner as in Example 12 except that the mass ratio of PVDF type resin A to PVDF type resin B was changed as shown in Table 1.

Examples 15 and 16

A separator was prepared in the same manner as in Example 12 except that the PVDF type resin B was changed to another PVDF type resin B (VDF-HFP copolymer, and Tm and Mw are as shown in Table 1).

Example 17

A separator was prepared in the same manner as in Example 12, except that the magnesium hydroxide particles were changed to other magnesium hydroxide particles (the average primary particle diameter is as shown in Table 1).

Comparative Example 2

In the same manner as in Example 12, however, PVDF type resin B was not used, and PVDF type resin A was increased by that amount to produce a separator.

Comparative Example 3

In the same manner as in Example 15, however, PVDF type resin A was not used, and PVDF type resin B was increased by that amount to prepare a separator.

Comparative Example 4

In the same manner as in Example 16, however, PVDF type resin A was not used, and PVDF type resin B was increased by that amount to prepare a separator.

Comparative Example 5

In the same manner as in Example 12, however, PVDF type resin A was not used, and PVDF type resin B was increased by that amount to prepare a separator.

A composition, physical properties, and evaluation results of each separator of Examples 1 to 17 and Comparative Examples 1 to 5 are shown in Table 1.

TABLE 1

| | PVDF type resin A | | | PVDF type resin B | | | Resin A: Resin B Mass | Filler | | | Heat-resistant porous layer | | | Separator | | Area shrinkage ratio | Adhesive strength |
|---|---|---|---|---|---|---|---|---|---|---|---|---|---|---|---|---|---|
| | Kind | Tm | Mw | Kind | Tm | MW | ratio | Kind | Average primary particle diameter | Content % by volume | Thickness (Total thickness of both sides) | Coating amount (Total thickness of both sides) | Porosity | Thickness | Gurley seconds/100 mL | treatment 135° C. | to electrode |
| | — | ° C. | $\times 10^4$ | — | ° C. | $\times 10^4$ | — | — | µm | | µm | $g/m^2$ | % | µm | | % | N/15 mm |
| Example 1 | VDF-TFE | 132 | 130 | VDF-HFP | 152 | 113 | 50:50 | $BaSO_4$ | 0.05 | 61 | 4.1 | 6 | 58 | 13.2 | 225 | 9 | 0.13 |
| Example 2 | VDF-TFE | 132 | 130 | VDF-HFP | 152 | 113 | 50:50 | $BaSO_4$ | 0.05 | 61 | 5.9 | 8 | 60 | 15.0 | 240 | 6 | 0.13 |
| Example 3 | VDF-TFE | 132 | 130 | VDF-HFP | 136 | 86 | 50:50 | $BaSO_4$ | 0.05 | 61 | 3.9 | 6 | 55 | 13.0 | 205 | 10 | 0.14 |
| Example 4 | VDF-TFE | 132 | 130 | VDF-HFP | 131 | 34 | 50:50 | $BaSO_4$ | 0.05 | 61 | 4.0 | 6 | 56 | 13.1 | 230 | 6 | 0.12 |
| Example 5 | VDF-TFE | 132 | 130 | VDF-HFP | 152 | 113 | 50:50 | $BaSO_4$ | 0.06 | 61 | 4.9 | 5 | 68 | 14.0 | 208 | 12 | 0.15 |
| Example 6 | VDF-TFE | 132 | 130 | VDF-HFP | 152 | 113 | 50:50 | $BaSO_4$ | 0.10 | 61 | 4.8 | 6 | 65 | 13.9 | 210 | 11 | 0.14 |
| Example 7 | VDF-TFE | 121 | 117 | VDF-HFP | 152 | 113 | 50:50 | $BaSO_4$ | 0.05 | 61 | 4.4 | 6 | 61 | 13.5 | 210 | 14 | 0.21 |
| Example 8 | VDF-TFE | 148 | 91 | VDF-HFP | 152 | 113 | 50:50 | $BaSO_4$ | 0.05 | 61 | 3.9 | 6 | 58 | 13.0 | 218 | 17 | 0.12 |
| Example 9 | VDF-TFE | 130 | 60 | VDF-HFP | 152 | 113 | 50:50 | $BaSO_4$ | 0.05 | 61 | 4.1 | 6 | 60 | 13.2 | 217 | 10 | 0.16 |
| Example 10 | VDF-TFE | 126 | 26 | VDF-HFP | 152 | 113 | 50:50 | $BaSO_4$ | 0.05 | 61 | 4.0 | 6 | 56 | 13.1 | 223 | 6 | 0.08 |
| Example 11 | VDF-TFE | 132 | 130 | PVDF | 170 | 66 | 50:50 | $BaSO_4$ | 0.05 | 61 | 4.1 | 6 | 58 | 13.2 | 227 | 10 | 0.10 |
| Comparative Example 1 | | — | | VDF-HFP | 152 | 113 | 0:100 | $BaSO_4$ | 0.05 | 61 | 4.9 | 5 | 68 | 14.0 | 208 | 11 | 0.01 |
| Example 12 | VDF-TFE | 132 | 130 | VDF-HFP | 131 | 34 | 50:50 | $Mg(OH)_2$ | 0.8 | 53 | 3.5 | 3 | 56 | 12.6 | 198 | 35 | 0.29 |
| Example 13 | VDF-TFE | 132 | 130 | VDF-HFP | 131 | 34 | 25:75 | $Mg(OH)_2$ | 0.8 | 53 | 3.5 | 3 | 57 | 12.6 | 193 | 36 | 0.28 |
| Example 14 | VDF-TFE | 132 | 130 | VDF-HFP | 131 | 34 | 75:25 | $Mg(OH)_2$ | 0.8 | 53 | 2.8 | 3 | 47 | 11.9 | 198 | 36 | 0.22 |

TABLE 1-continued

| | PVDF type resin A | | | PVDF type resin B | | | Resin A: Resin B Mass ratio | Filler | | | Heat-resistant porous layer | | | Separator | | Area shrinkage ratio treatment 135° C. | Adhesive strength to electrode |
|---|---|---|---|---|---|---|---|---|---|---|---|---|---|---|---|---|---|
| | Kind — | Tm ° C. | Mw × $10^4$ | Kind — | Tm ° C. | MW × $10^4$ | — | Kind — | Average primary particle diameter µm | Content % by volume | Thickness (Total thickness of both sides) µm | Coating amount (Total thickness of both sides) g/m$^2$ | Porosity % | Thickness µm | Gurley seconds/100 mL | % | N/15 mm |
| Example 15 | VDF-TFE | 132 | 130 | VDF-HFP | 152 | 113 | 50:50 | $Mg(OH)_2$ | 0.8 | 53 | 3.6 | 3 | 57 | 12.7 | 199 | 34 | 0.21 |
| Example 16 | VDF-TFE | 132 | 130 | VDF-HFP | 136 | 86 | 50:50 | $Mg(OH)_2$ | 0.8 | 53 | 3.7 | 3 | 57 | 12.8 | 202 | 35 | 0.27 |
| Example 17 | VDF-TFE | 132 | 130 | VDF-HFP | 131 | 34 | 50:50 | $Mg(OH)_2$ | 0.5 | 53 | 4.0 | 3 | 59 | 13.1 | 198 | 26 | 0.27 |
| Comparative Example 2 | VDF-TFE | 132 | 130 | | — | | 100:0 | $Mg(OH)_2$ | 0.8 | 53 | 4.8 | 3 | 71 | 13.9 | 191 | 37 | 0.15 |
| Comparative Example 3 | | — | | VDF-HFP | 152 | 113 | 0:100 | $Mg_2(OH)$ | 0.8 | 53 | 6.4 | 3 | 78 | 15.5 | 201 | 36 | 0.13 |
| Comparative Example 4 | | — | | VDF-HFP | 136 | 86 | 0:100 | $Mg(OH)_2$ | 0.8 | 53 | 3.5 | 3 | 58 | 12.6 | 208 | 38 | 0.16 |
| Comparative Example 5 | | — | | VDF-HFP | 131 | 34 | 0:100 | $Mg(OH)_2$ | 0.8 | 53 | 7.0 | 3 | 80 | 16.1 | 178 | 39 | 0.11 |

The disclosure of Japanese Patent Application No. 2019-049545 filed on Mar. 18, 2019 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:

a porous substrate; and a heat-resistant porous layer that is provided on one side or on both sides of the porous substrate, and that contains a polyvinylidene fluoride type resin A that is a polyvinylidene fluoride type resin containing a tetrafluoroethylene unit; a polyvinylidene fluoride type resin B that is a homopolymer of vinylidene fluoride or a copolymer of vinylidene fluoride and a monomer other than tetrafluoroethylene; and a filler, wherein a melting point of the polyvinylidene fluoride type resin A is from 120° C. to 150° C., wherein a total content of the polyvinylidene fluoride type resin A and the polyvinylidene fluoride type resin B contained in the heat-resistant porous layer is 100% by mass with respect to the total amount of the binder resin contained in the heat-resistant porous layer, wherein a mass ratio of the polyvinylidene fluoride type resin A and the polyvinylidene fluoride type resin B contained in the heat-resistant porous layer is from 25:75 to 75:25, and wherein an average primary particle diameter of the filler contained in the heat-resistant porous layer is from 0.01 µm to 1.0 µm.

2. The separator for a non-aqueous secondary battery according to claim 1, wherein a melting point of the polyvinylidene fluoride type resin B is from 120° C. to 173° C.

3. The separator for a non-aqueous secondary battery according to claim 1, wherein the polyvinylidene fluoride type resin B is a polyvinylidene fluoride type resin containing a hexafluoropropylene unit.

4. The separator for a non-aqueous secondary battery according to claim 1, wherein a porosity of the heat-resistant porous layer is from 30% to 90%.

5. A non-aqueous secondary battery that obtains electromotive force by lithium doping and dedoping, the non-aqueous secondary battery comprising:

a positive electrode;

a negative electrode; and the separator for a non-aqueous secondary battery according to claim 1, the separator being disposed between the positive electrode and the negative electrode.

6. A separator for a non-aqueous secondary battery, the separator comprising:

a porous substrate; and a heat-resistant porous layer that is provided on one side or on both sides of the porous substrate, and that contains a polyvinylidene fluoride type resin A that is a polyvinylidene fluoride type resin containing a tetrafluoroethylene unit; a polyvinylidene fluoride type resin B that is a homopolymer of vinylidene fluoride or a copolymer of vinylidene fluoride and a monomer other than tetrafluoroethylene; and a filler, wherein a melting point of the polyvinylidene fluoride type resin A is from 120° C. to 150° C., wherein a total content of the polyvinylidene fluoride type resin A and the polyvinylidene fluoride type resin B contained in the heat-resistant porous layer is 100% by mass with respect to the total amount of the binder resin contained in the heat-resistant porous layer, wherein a weight average molecular weight of the polyvinylidene fluoride type resin A is from 600,000 to 3,000,000, wherein a weight average molecular weight of the polyvinylidene fluoride type resin B is from 300,000 to 3,000,000, and wherein an average primary particle diameter of the filler contained in the heat-resistant porous layer is from 0.01 μm to 1.0 μm.

7. The separator for a non-aqueous secondary battery according to claim 6, wherein a melting point of the polyvinylidene fluoride type resin B is from 120° C. to 173° C.

8. The separator for a non-aqueous secondary battery according to claim 6, wherein the polyvinylidene fluoride type resin B is a polyvinylidene fluoride type resin containing a hexafluoropropylene unit.

9. The separator for a non-aqueous secondary battery according to claim 6, wherein a porosity of the heat-resistant porous layer is from 30% to 90%.

10. A non-aqueous secondary battery that obtains electromotive force by lithium doping and dedoping, the non-aqueous secondary battery comprising:

a positive electrode;

a negative electrode; and the separator for a non-aqueous secondary battery according to claim 6, the separator being disposed between the positive electrode and the negative electrode.

11. A separator for a non-aqueous secondary battery, the separator comprising:

a porous substrate; and a heat-resistant porous layer that is provided on one side or on both sides of the porous substrate, and that contains a polyvinylidene fluoride type resin A that is a polyvinylidene fluoride type resin containing a tetrafluoroethylene unit; a polyvinylidene fluoride type resin B that is a homopolymer of vinylidene fluoride or a copolymer of vinylidene fluoride and a monomer other than tetrafluoroethylene; and a filler, wherein a melting point of the polyvinylidene fluoride type resin B is from 120° C. to 173° C., wherein a total content of the polyvinylidene fluoride type resin A and the polyvinylidene fluoride type resin B contained in the heat-resistant porous layer is 100% by mass with respect to the total amount of the binder resin contained in the heat-resistant porous layer, wherein a mass ratio of the polyvinylidene fluoride type resin A and the polyvinylidene fluoride type resin B contained in the heat-resistant porous layer is from 25:75 to 75:25, and wherein an average primary particle diameter of the filler contained in the heat-resistant porous layer is from 0.01 μm to 1.0 μm.

12. The separator for a non-aqueous secondary battery according to claim 11, wherein the polyvinylidene fluoride type resin B is a polyvinylidene fluoride type resin containing a hexafluoropropylene unit.

13. The separator for a non-aqueous secondary battery according to claim 11, wherein a porosity of the heat-resistant porous layer is from 30% to 90%.

14. A non-aqueous secondary battery that obtains electromotive force by lithium doping and dedoping, the non-aqueous secondary battery comprising:

a positive electrode;

a negative electrode; and the separator for a non-aqueous secondary battery according to claim 11, the separator being disposed between the positive electrode and the negative electrode.

15. A separator for a non-aqueous secondary battery, the separator comprising:

a porous substrate; and a heat-resistant porous layer that is provided on one side or on both sides of the porous substrate, and that contains a polyvinylidene fluoride type resin A that is a polyvinylidene fluoride type resin containing a tetrafluoroethylene unit; a polyvinylidene fluoride type resin B that is a homopolymer of vinylidene fluoride or a copolymer of vinylidene fluoride and a monomer other than tetrafluoroethylene; and a filler, wherein a melting point of the polyvinylidene fluoride type resin B is from 120° C. to 173° C., wherein a total content of the polyvinylidene fluoride type resin A and the polyvinylidene fluoride type resin B contained in the heat-resistant porous layer is 100% by mass with respect to the total amount of the binder resin contained in the heat-resistant porous layer, wherein a weight average molecular weight of the polyvinylidene fluoride type resin A is from 600,000 to 3,000,000, wherein a weight average molecular weight of the polyvinylidene fluoride type resin B is from 300,000 to 3,000,000, and wherein an average primary particle diameter of the filler contained in the heat-resistant porous layer is from 0.01 μm to 1.0 μm.

16. The separator for a non-aqueous secondary battery according to claim 15, wherein the polyvinylidene fluoride type resin B is a polyvinylidene fluoride type resin containing a hexafluoropropylene unit.

17. The separator for a non-aqueous secondary battery according to claim 15, wherein a porosity of the heat-resistant porous layer is from 30% to 90%.

18. A non-aqueous secondary battery that obtains electromotive force by lithium doping and dedoping, the non-aqueous secondary battery comprising:

a positive electrode;

a negative electrode; and the separator for a non-aqueous secondary battery according to claim 15, the separator being disposed between the positive electrode and the negative electrode.

* * * * *